(12) United States Patent
Li et al.

(10) Patent No.: US 9,507,884 B2
(45) Date of Patent: Nov. 29, 2016

(54) MODELING SYSTEM AND MODELING METHOD BASED ON LOGICAL RELATION

(71) Applicant: QINGDAO POWER SUPPLY COMPANY OF SHANDONG ELECTRIC POWER GROUP CORPORATION, Qingdao, Shandong (CN)

(72) Inventors: Jian Ying Li, Qingdao (CN); Sheng Chuan Zhao, Qingdao (CN); Yuan Long Liu, Qingdao (CN); Lu Dong Luo, Qingdao (CN); Qiang Wang, Qingdao (CN); Yuan Zhang, Qingdao (CN); Wen Gang Wang, Qingdao (CN); Chao Wang, Qingdao (CN); Rui Peng Zhang, Qingdao (CN); Li Wang, Qingdao (CN); Ze Zhong Wang, Qingdao (CN); Gong Pu Wang, Qingdao (CN); Xin Yang, Qingdao (CN); Hui Yang, Qingdao (CN)

(73) Assignee: QINGDAO POWER SUPPLY COMPANY OF SHANDONG ELECTRIC POWER GROUP CORPORATION, Shandong (CN)

( * ) Notice: Subject to any disclaimer, the term of this patent is extended or adjusted under 35 U.S.C. 154(b) by 610 days.

(21) Appl. No.: 13/956,831

(22) Filed: Aug. 1, 2013

(65) Prior Publication Data
US 2014/0039865 A1 Feb. 6, 2014

(30) Foreign Application Priority Data
Aug. 2, 2012 (CN) .......................... 2012 1 0273147

(51) Int. Cl.
G06F 17/50 (2006.01)
(52) U.S. Cl.
CPC ............ *G06F 17/50* (2013.01); *G06F 17/509* (2013.01)

(58) Field of Classification Search
CPC .............................. G06F 17/509; G06F 17/50
USPC ...................................... 703/18, 13; 345/419
See application file for complete search history.

(56) References Cited

U.S. PATENT DOCUMENTS 7,247,553 B2 * 7/2007 Ohayashi ............ H01L 23/5226
257/E21.576
2004/0236620 A1 11/2004 Chauhan et al.
(Continued)

FOREIGN PATENT DOCUMENTS

| CN | 101436790 A | 5/2009 |
| CN | 101789042 A | 7/2010 |
| CN | 102375827 A * | 3/2012 |

OTHER PUBLICATIONS

Ling, Liu et al., "Distribution Circuit Information Model and Its Application", Jan. 6-7, 2012, International Conference on Intelligent Systems Design and Engineering Application, IEEE Computer Society.*
Shenming, Zhang et al., "CIM-Based G.M.D. Method for Power System Modeling", 2002, IEEE.*
(Continued)

*Primary Examiner* — Cedric D Johnson
(74) *Attorney, Agent, or Firm* — Oliff PLC

(57) ABSTRACT

A modeling system and modeling method based on a logical relation, including an operation task integrating module, a task interpreter, a graph layout correcting module, a graph wiring correcting module and a database model increment correcting module, wherein the database model increment correcting module includes a graph increment calculating unit and a model increment calculating unit. The system, through description of the logical relation and based on support of the automatic wiring technology, realizes the graph-model integrated generation of a new grid model of the power system which is based on the description of the logical relation; the grid model is completely defined and modified on "one net", which is different from the original way that the power system model is established on countless net graphs, thereby helping the grid operation manager to accurately and rapidly establish and modify the grid model of the full system.

7 Claims, 5 Drawing Sheets

(56) References Cited

U.S. PATENT DOCUMENTS

2012/0254849 A1* 10/2012 Wang .................. G06F 8/65
717/168
2013/0091258 A1* 4/2013 Shaffer .................. H02J 3/00
709/221

OTHER PUBLICATIONS

Radford M.F., "Electronically Scanned Antenna Systems", Nov. 1978, Proc. IEE, vol. 125, No. 11R, IEE Reviews.*

* cited by examiner

MODELING SYSTEM AND MODELING METHOD BASED ON LOGICAL RELATION

CROSS-REFERENCE TO RELATED APPLICATIONS

Pursuant to 35 U.S.C. §119 and the Paris Convention Treaty, this application claims the benefit of Chinese Patent Application No. 201210273147.9 filed on Aug. 2, 2012, the contents of which are incorporated herein by reference.

BACKGROUND OF THE INVENTION

Field of the Invention

The invention relates to the field of construction of grid models of power systems, and in particular to a modeling system and a modeling method based on logical relation.

Description of Related Art

A grid model is a basis of all analysis, decision and management related to a power system. It is very important that the model exists and is complete, accurate and easy to establish. The conventional grid model definition method is a graph-model-database integration method, that is, a graph is drawn at first, and then a model is generated and written into a relational database. The graph is manually drawn, and topological description is realized by adopting a method based on physical nodes under the condition that each equipment object has one or more articulation points through drawing connection lines between the articulation points; and generally a station graph is used as a unit in the graph drawing range, and a connecting relation is established between stations through lines, so that the grid model of the whole system is generated. The method has advantages that when the grid scale is small, there are only a few external equipments and branches, but when the scale of the system is relatively large and connection is relatively complex, as the station graph is used as the unit, hundreds of and even more stations are involved in the station graph in the system model, so that the management and the maintenance become difficult, and errors are easily generated, in addition, a "point-to-point connection" mode based on physical nodes has too many operation steps and may easily cause model description errors due to artificial operational errors, moreover, the boundary cut in the modeling mode that the station graph is used as the unit in the presence of much external equipment and many branches becomes complex, and the factors cause difficult definition of the grid model and seriously affect support and reliability of application analysis and decision making of the power system.

SUMMARY OF THE INVENTION

In view of the above-described problem, it is one object of the invention to provide a modeling system and a modeling method based on a logical relation, which are easy to operate and reliable in operation.

To achieve the above objectives, in accordance with one embodiment of the invention provided is a modeling system based on a logical relation, comprising:
an operation task integrating module for dividing integrated operation tasks into different classes, wherein the classes comprise adding operation objects, deleting operation objects and modifying operation objects;
a task interpreter for acquiring command information of the operation task integrating module and performing task splitting on the command information;
a graph layout correcting module for putting the operation objects on grid nodes by adopting rectangular lattice description, wherein when one or more spatial point operation objects are newly added, the associated spatial points of adjacent areas are required to automatically shift;
a graph wiring correcting module for performing wiring according to the fewest crosses and the shortest paths and correcting the associated objects on the wiring paths;
a database model increment correcting module for correspondingly performing model addition, deletion and modification actions according to the actions of the graph layout correcting module and the graph wiring correcting module, comprising:
a graph increment calculating unit for calculating a current graph increment according to the actions of the graph layout correcting module and the graph wiring correcting module, wherein the current graph increment comprises a grid primitive object increment and a topological relation change increment;
a model increment calculating unit for calculating a current model increment according to the current graph increment acquired by the graph increment calculating unit; and
a relational database for storing a grid model after the model increment corresponding to the graph increment is corrected.

In a class of this embodiment, an integrated task splitting mechanism is adopted in task splitting of the task interpreter, which accords with the IEC61968/61970 standard.

In a class of this embodiment, the shortest paths are horizontal and vertical lines which do not exceed a rectangular area formed by double nodes under the condition that oblique lines are not adopted.

In a class of this embodiment, the fewest crosses are obtained through transposition and reversing simulation calculation of a local area.

In a class of this embodiment, the operation objects comprise container objects, main connection wires in the container objects and connections between the container objects.

In a class of this embodiment, the container objects comprise stations, switching stations, ring main units, branch boxes and box transformers.

A modeling method using the modeling system, comprising the following steps:
(1) dividing integrated operation tasks into different classes, wherein the classes comprise adding operation objects, deleting operation objects and modifying operation objects;
(2) performing task splitting on command information of the operation tasks;
(3) performing automatic graph layout correction on the operation objects, and putting the operation objects on grid nodes by adopting rectangular lattice description, wherein when one or more spatial point operation objects are newly added, the associated spatial points of the adjacent areas are required to automatically shift;
(4) performing automatic graph wiring correction on the operation objects, performing wiring according to the fewest crosses and the shortest paths and correcting the associated objects on the wiring paths;
(5) calculating a current graph increment according to the results of the graph layout correction and the graph wiring correction;
(6) calculating a current model increment according to the acquired current graph increment; and (7) performing corresponding addition, deletion and correction actions according to the model increment corresponding to the graph increment and performing storage.

Compared with the prior art, the invention has the following advantages:

The invention provides the modeling system based on the logical relation, which comprises the operation task integrating module, the task interpreter, the graph layout correcting module, the graph wiring correcting module and the database model increment correcting module. Meanwhile, the invention also provides a modeling method using the modeling system. The system, through description of the logical relation and based on support of the automatic wiring technology, realizes the graph-model integrated generation of a new grid model of the power system which is based on the description of the logical relation in a graphic mode; the grid model is completely defined and modified on "one net", which is different from the original way that the power system model is established on countless net graphs, thereby helping the grid operation manager to accurately and rapidly establish and modify the grid model of the full system; and the modeling system is clear and direct, reliable, accurate and easy. Compared with the prior art, logical description is adopted in the system, the logical relation description language is converted into spatial topological description information, graphical language description of spatial points and lines is further formed, the previous multi-step operations are fused into a single-task operation, the connections between the points and the lines are realized by using the automatic layout and wiring technology, and the principle of shortest paths and fewest crosses is adopted in the point-line connection; graphical expression of the logical modeling language is realized, increment parts of objects in the model and library objects are automatically calculated, added and deleted, one-to-one correspondence of the graphical objects and the objects in the network database model is realized, the model definition problem which exists for long time in the power system is solved, and the definition method of the network model of the power system is simplified; and the model definition contents are submitted by using a descriptive logical language method, so that the model definition speed is improved, the model definition difficulty is reduced, the model definition accuracy is improved, and generation of the definition of a complex large system model is ensured.

The invention provides a modeling method using the system, which can be applied to generation of transmission network models and distribution network models and is particularly suitable for definition and generation of large-scale transmission network models or distribution network models with complex connection relationships.

By adopting the modeling system and the modeling method provided by the invention, the problems that the large-scale grid models and the grid models with complex connection relationship are fussy to establish, easy to get wrong and difficult to maintain are solved; as long as the technology is adopted, when a model is established on a graph, the size and the range of the model are clear, and repair on hundreds of net graphs is not required, so that the modeling intuition is improved; the original operation process based on physical nodes is logically described as in a single-task type, and the multi-step operation is completed through programs, so that the establishment process of the grid model is simplified; and the model is established on the graph in an increment mode, so that strict consistency of the graph and the model is maintained, and the overall integrated modeling problem puzzling the power department for a long time is solved.

DRAWINGS OF THE INVENTION

For the purpose that the contents of the invention are more readily clearly understood, the invention is further illustrated in detail below according to the embodiments of the invention in conjunction with the drawings, wherein FIG. 1 is a structural schematic diagram of an embodiment of a modeling system based on a logical relation described in the invention;

Figure 2:
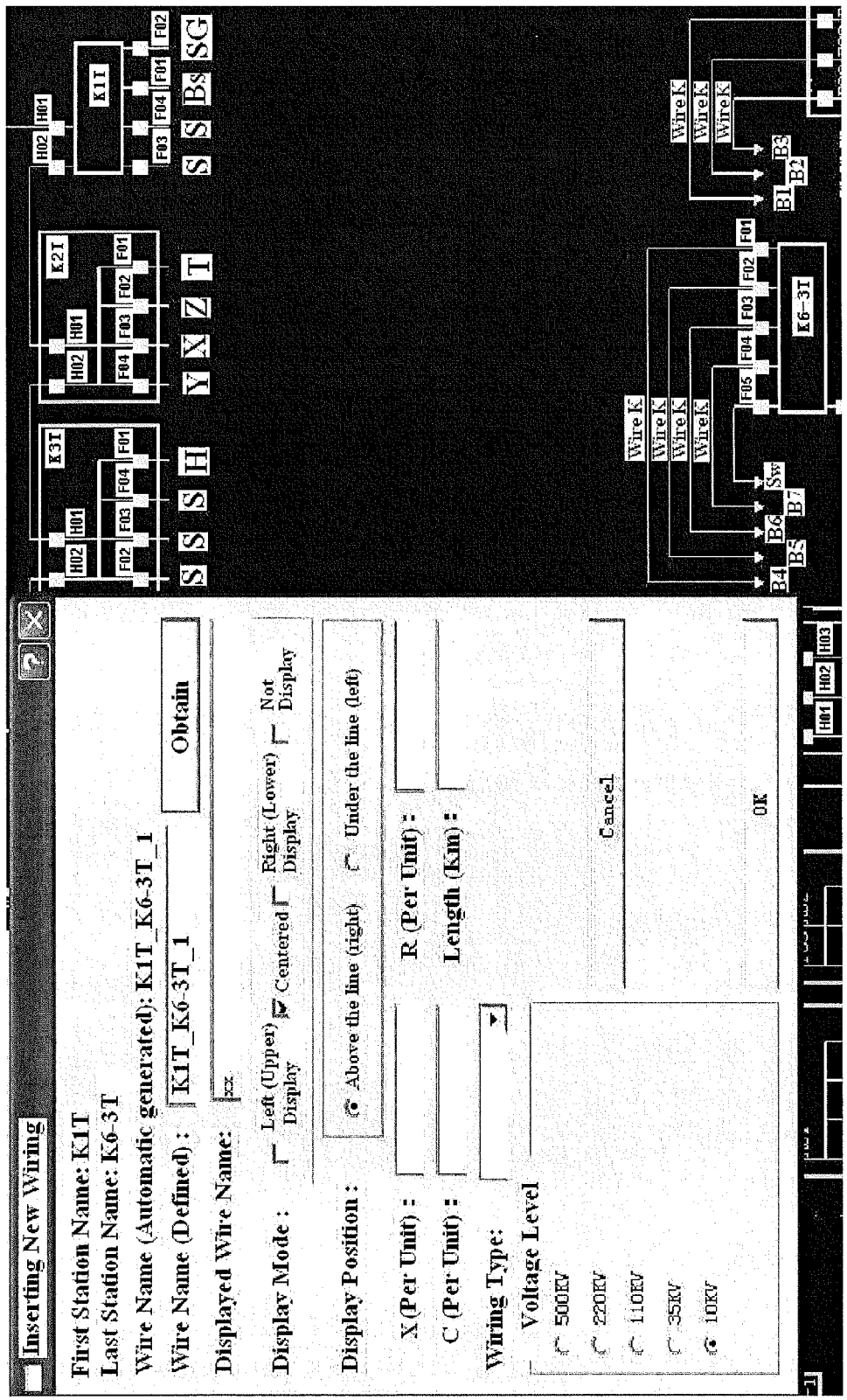
FIG. 2 is a connection relationship logical definition diagram of the modeling system based on the logical relation of one embodiment illustrated in FIG. 1.
Figure 3:
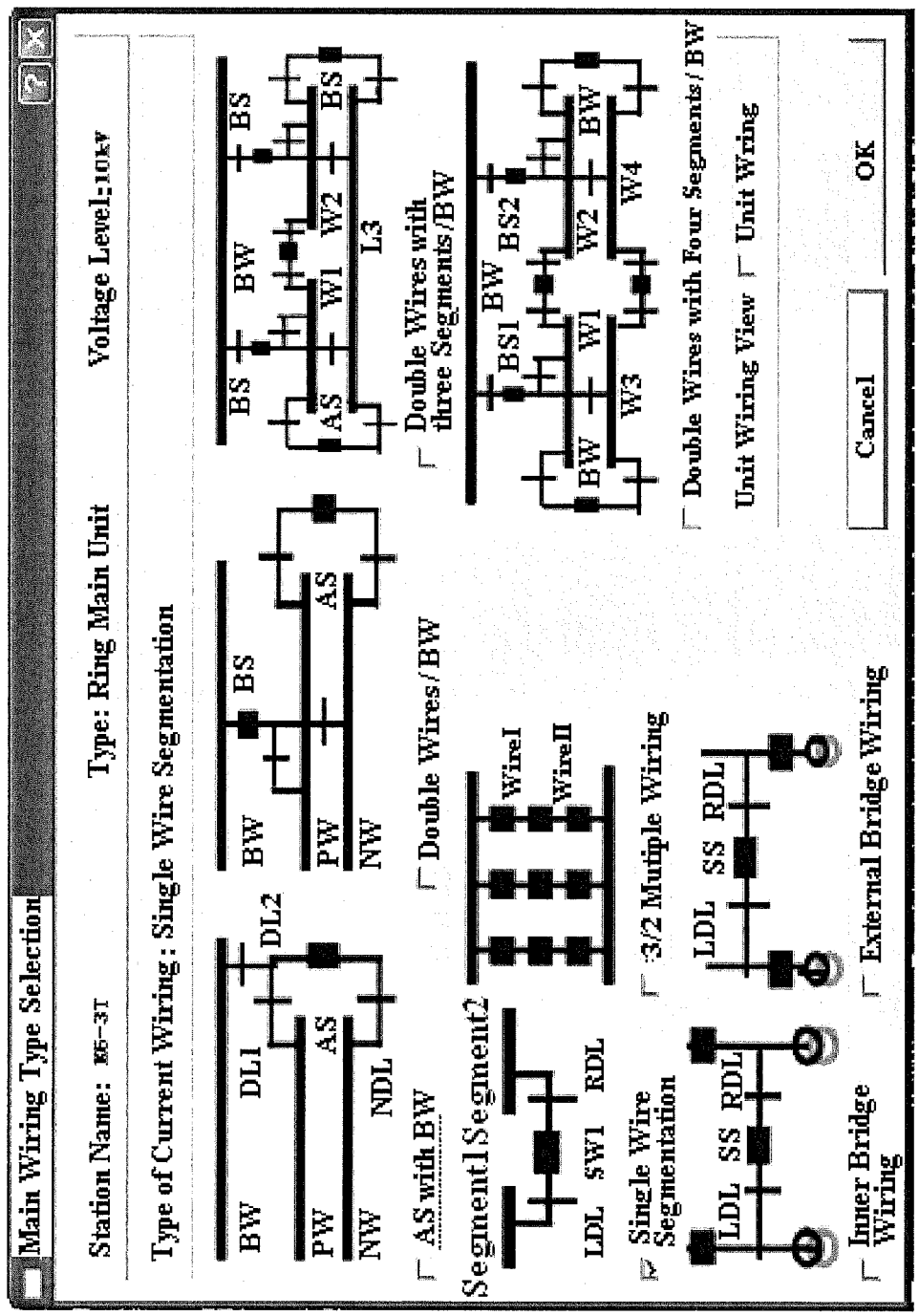
FIG. 3 is an in-station topological logical definition diagram of the modeling system based on the logical relation of one embodiment illustrated in FIG. 1.
Figure 4:
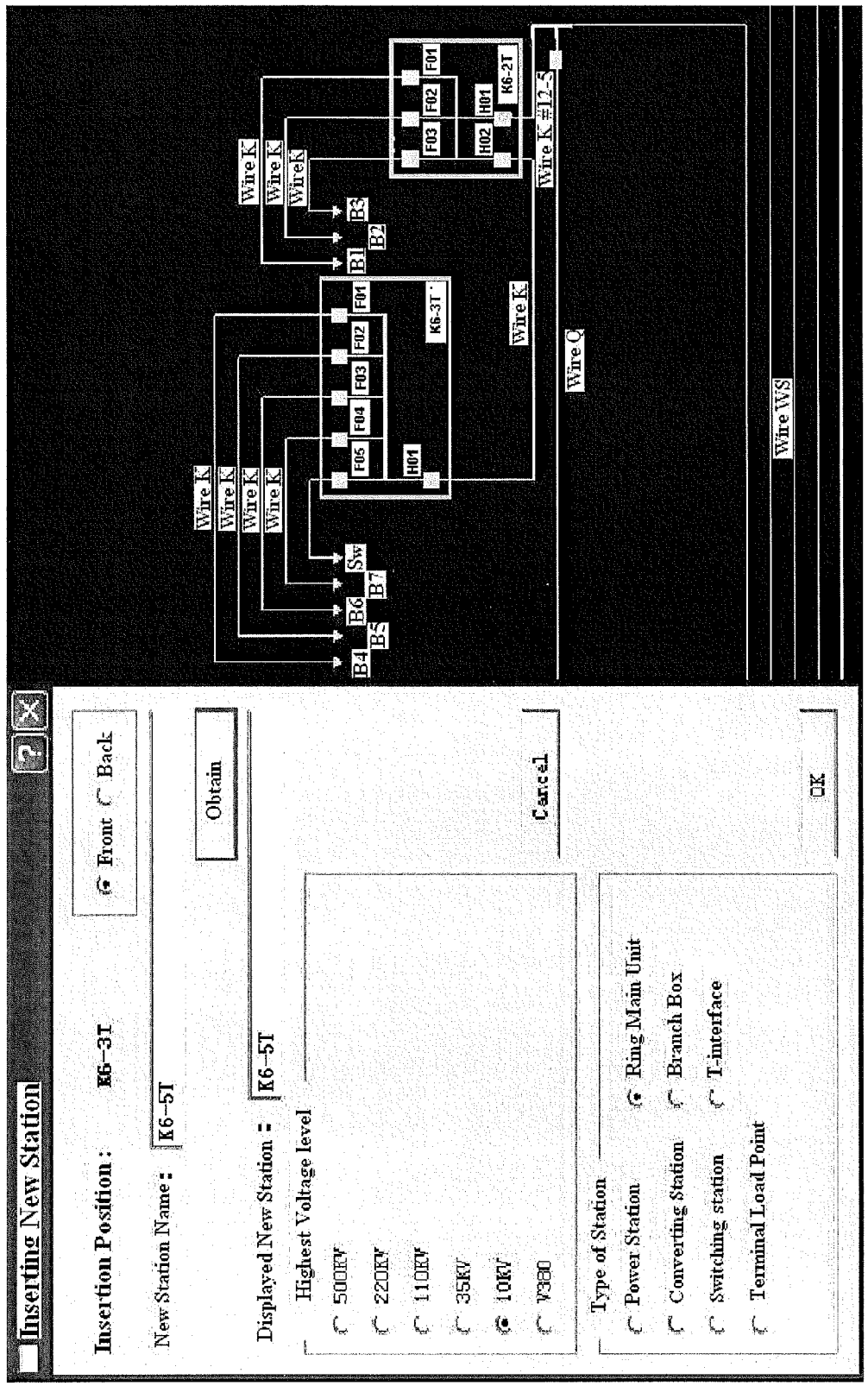
FIG. 4 is a container object adding graph of the modeling system based on the logical relation of one embodiment illustrated in FIG. 1.

Wherein, FIG. 2-4 are a set of screen shots of a modeling software with the corresponding words translated into English.

Reference signs in the drawings are as follows: 1 represents operation task integrating module; 2 represents task interpreter; 3 represents graph layout correcting module; 4 represents graph wiring correcting module; 5 represents database model increment correcting module; 51 represents graph increment calculating unit; 52 represents model increment calculating unit; and 53 represents relational database.

DETAILED DESCRIPTION OF THE EMBODIMENTS

Embodiments

Figure 1:
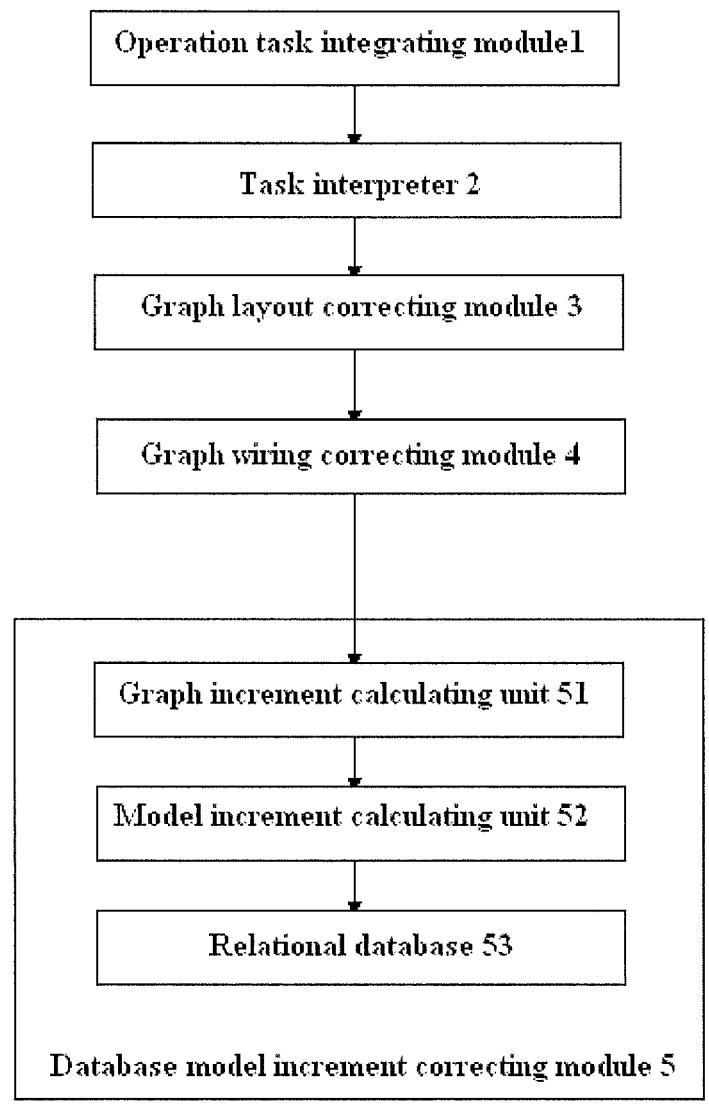

One embodiment of the modeling system based on a logical relation described in the invention is provided below. As shown in FIG. 1, the modeling system based on the logical relation comprises an operation task integrating module 1, a task interpreter 2, a graph layout correcting module 3, a graph wiring correcting module 4 and a database model increment correcting module 5.

The operation task integrating module 1 comprises adding operation objects, deleting operation objects and modifying operation objects. In the embodiment, the operation objects comprise container objects, main connection wires in the container objects and connections between the container objects, wherein the container objects comprise stations, switching stations, ring main units, branch boxes and box transformers. FIGS. 2, 3 and 4 are screen shots, only for clearly explain the way of definition. Wherein, FIG. 2 and FIG. 3 are the connection relationship logical definition graph and the in-station topological logical definition graph of the modeling system. In the FIG. 2, X represents reactance, C represents Capacity, R represents Resistance, B represents Box transformer, S represents "Standby", H, Y, X, Z, T, Bs, and SG respectively represent a terminal. In the FIG. 3, BW represents Branch Wire, PW represents Positive Wire, NW represents Negative Wire, DL represents Disconnecting Link, AS represents Associate Switch, LDL represents Left Disconnecting Link, RDL represents Right Disconnecting Link, SS represents Segmentation Switch, W represents Wire. FIG. 4 is the container object adding graph of the modeling system. In the FIG. 4, B represents Box transformer.

The task interpreter 2 is used for acquiring command information of the operation task integrating module 1 and performing task splitting on the command information to form five-step tasks, such as graph layout correction, graph wiring correction, graph increment calculation, model increment calculation and storage of a grid model after the model increment is modified, for example, with respect to the command information of adding a line between a station 1 and a station 2, the splitting task comprises: (1) calculating an interval, a wire outlet direction and a wire outlet sequence for the station 1; (2) calculating an interval, a wire outlet direction and a wire outlet sequence for the station 2; (3) calculating object moving data in a rectangular area of the station 1 and the station 2; (4) calculating a wiring channel and moving position data between the added stations 1 and 2; (5) acquiring the graph increment comprising the main connection change in the station 1 and the station 2, the external station shifting data and the wiring channel, and correcting the graph and refreshing the display; and (6) acquiring the model increment comprising new lines, line switches and new nodes, correcting the relationship among the branches, the nodes, the voltage level and the station containers, and correcting the model to the relational database. In the embodiment, an integrated task splitting mechanism is adopted in task splitting of the task interpreter, which accords with the IEC61968/61970 standard.

The graph layout correcting module 3 is used for putting the operation objects on grid nodes by adopting rectangular lattice description, wherein when one or more spatial point operation objects are newly added, the associated spatial points of the adjacent areas are required to automatically shift.

The graph wiring correcting module 4 is used for performing wiring according to fewest crosses and shortest paths and correcting the associated objects on the wiring paths. In the embodiment, the fewest crosses are obtained through transposition and reversing simulation calculation of a local area, and the shortest paths are horizontal and vertical lines which do not exceed a rectangular area formed by double nodes under the condition that oblique lines are not adopted. Taking main connection wire splitting in a ring main unit for example, the correction of the main connection wires in the container objects comprises: (1) calculating the wire outlet direction and the interval of buses in the ring main unit and calculating the wire outlet sequence with the fewest crosses; (2) calculating the external object layout shifting data of the ring main unit; (3) correcting the layout graph; (4) correcting the wiring graph after shifting; and (5) acquiring a model increment comprising new buses and section switches in the ring main unit.

The database model increment correcting module 5 is used for correspondingly performing model addition, deletion and modification actions according to the actions of the graph layout correcting module 3 and the graph wiring correcting module 4. The database model increment correcting module 5 comprises: a graph increment calculating unit 51 for calculating a current graph increment according to the actions of the graph layout correcting module 3 and the graph wiring correcting module 4, the graph increment comprising a grid primitive object increment and a topological relation change increment, wherein taking deletion of a certain line for example, the graph increment comprises line segments of the lines itself, main connection wires in the associated station 1 and main connection wires in the associated station 2, and the model increment comprises deleted lines and associated switches, disconnecting links and physical nodes on the deleted lines; a model increment calculating unit 52 for calculating a current model increment according to the current graph increment acquired by the graph increment calculating unit 51; and a relational database 53 for storing a grid model after the model increment corresponding to the graph increment is corrected.

In the embodiment, the hardware of the system mainly comprises a UNIX/LINUX workstation with a graph acceleration chip.

Meanwhile, the invention provides a modeling method using the modeling system, comprising the following steps:

(1) dividing integrated operation tasks into different classes, wherein the classes comprise adding operation objects, deleting operation objects and modifying operation objects;

(2) performing task splitting on command information of the operation tasks;

(3) performing automatic graph layout correction on the operation objects, and putting the operation objects on grid nodes by adopting rectangular lattice description, wherein when one or more spatial point operation objects are newly added, the associated spatial points of the adjacent areas are required to automatically shift;

(4) performing automatic graph wiring correction on the operation objects, performing wiring according to fewest crosses and shortest paths and correcting the associated objects on the wiring paths;

(5) calculating a current graph increment according to the results of the graph layout correction and the graph wiring correction;

(6) calculating a current model increment according to the acquired current graph increment; and (7) performing corresponding addition, deletion and correction actions according to the model increment corresponding to the graph increment, and performing storage.

Figure 5:
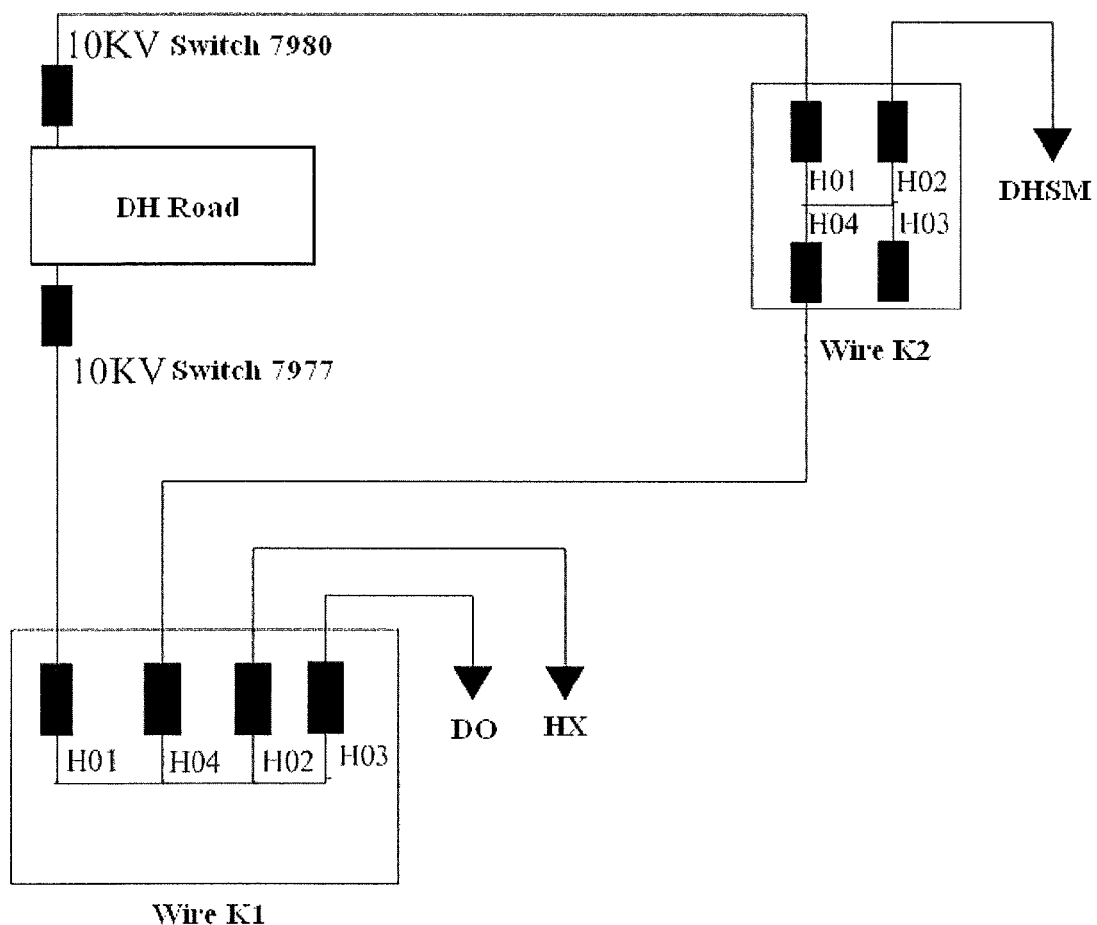
FIG. 5 is a free layout and wiring graph of another embodiment of the modeling system.

FIG. 5 shows a view of a free layout and wiring graph of another embodiment of the modeling system. And DHSM represents a terminal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A modeling system based on a logical relation, comprising:
   one or more processors programmed to perform the following functions:
   dividing integrated operation tasks into different classes comprising adding operation objects, deleting operation objects and modifying operation objects,
   acquiring, command information of the operation tasks and performing task splitting on said command information,
   putting said operation objects on grid nodes by adopting rectangular lattice description, wiring according to fewest crosses and shortest paths and correcting associated ones of the operation objects on wiring paths,
   correspondingly performing model addition, deletion and modification actions according to the said putting of said operation objects on grid nodes by adopting rectangular lattice description and said wiring according to fewest crosses and shortest paths and correcting said associated ones of the operation objects on wiring paths, when one or more spatial point operation objects are newly added, automatically shifting the associated spatial points of adjacent areas, calculating a current graph increment according to said putting of said operation objects on grid nodes by adopting rectangular lattice description and said wiring according to fewest crosses and shortest paths and correcting said associated ones of the operation objects on wiring paths, and calculating a current model increment according to the current graph increment acquired by said calculating of a current graph increment; and a memory including a relational database for storing a grid model after the model increment corresponding to the graph increment is corrected, the current graph increment comprising a grid primitive object increment and a topological relation change increment.

2. The modeling system of claim 1, wherein,
an integrated task splitting mechanism is adopted in said performing of task splitting of said command information, which is in accordance with the IEC61968/61970 standard.

3. The modeling system of claim 2, wherein,
said shortest paths are horizontal and vertical lines which do not exceed a rectangular area formed by double nodes under the condition that oblique lines are not adopted.

4. The modeling system of claim 3, wherein,
said fewest crosses are obtained through transposition and reversing simulation calculation of a local area.

5. The modeling system of claim 1, wherein,
said operation objects comprise container objects, main connection wires in said container objects and connections between said container objects.

6. The modeling system of claim 5, wherein,
said container objects comprise stations, switching stations, ring main units, branch boxes and box transformers.

7. A modeling method using the modeling system of claim 1, comprising the following steps:
(1) dividing integrated operation tasks into different classes comprising adding operation objects, deleting operation objects and modifying operation objects;
(2) performing task splitting on command information of the operation tasks;
(3) performing automatic graph layout correction on said operation objects, and putting said operation objects on grid nodes by adopting rectangular lattice description, wherein when one or more spatial point operation objects are newly added, the associated spatial points of adjacent areas are required to automatically shift;
(4) performing automatic graph wiring correction on said operation objects, performing wiring according to fewest crosses and shortest paths and correcting the associated objects on wiring paths;
(5) calculating a current graph increment according to the results of the graph layout associated ones of the operation objects on wiring paths;
(6) calculating a current model increment according to the acquired current graph increment; and
(7) performing corresponding addition, deletion and correction actions according to the model increment corresponding to the graph increment and performing storage.

* * * * *